United States Patent
Wilkinson et al.

(10) Patent No.: US 9,767,308 B2
(45) Date of Patent: Sep. 19, 2017

(54) CUSTOM SECURITY POLICIES FOR MULTIPLE OBJECTS

(71) Applicant: Rockwell Automation Technologies, Inc., Mayfield Heights, OH (US)

(72) Inventors: John C. Wilkinson, Hudson, OH (US); Robert A. Brandt, Menomonee Falls, WI (US); Clark L. Case, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/167,479

(22) Filed: May 27, 2016

(65) Prior Publication Data
US 2016/0350559 A1 Dec. 1, 2016

Related U.S. Application Data

(60) Provisional application No. 62/168,256, filed on May 29, 2015.

(51) Int. Cl.
*G06F 21/70* (2013.01)
*G06F 21/62* (2013.01)

(52) U.S. Cl.
CPC .......... *G06F 21/6218* (2013.01); *G06F 21/70* (2013.01)

(58) Field of Classification Search
None
See application file for complete search history.

(56) References Cited

U.S. PATENT DOCUMENTS

| | | | | |
|---|---|---|---|---|
| 6,192,355 B1* | 2/2001 | Skovgaard | ............ | G06F 15/177 706/46 |
| 7,447,553 B1* | 11/2008 | Haardorfer | ........ | G05B 13/0265 700/17 |
| 9,503,478 B2* | 11/2016 | Chernoguzov | ......... | H04L 63/06 |
| 2004/0153171 A1* | 8/2004 | Brandt | .................. | G05B 15/02 700/9 |
| 2011/0173043 A1* | 7/2011 | Maier | ................ | G06Q 10/0633 705/7.27 |
| 2013/0325997 A1* | 12/2013 | Higgins | .............. | H04L 41/0893 709/208 |
| 2015/0161193 A1* | 6/2015 | Damodar | .......... | G06F 17/30371 707/694 |
| 2016/0080425 A1* | 3/2016 | Cianfrocca | ......... | H04L 63/0227 726/1 |

* cited by examiner

*Primary Examiner* — Christopher Revak

(57) ABSTRACT

Techniques to facilitate controlling access to objects associated with an industrial automation environment are disclosed. In at least one implementation, a policy set associated with an object type is created, wherein the policy set defines one or more actions that are allowed for at least one user group to perform with respect to the object type. An object of the object type is identified for security configuration, and a selection of the policy set associated with the object type to apply to the object is received. In response to the selection of the policy set, security is configured for the object by applying the policy set associated with the object type to the object.

20 Claims, 4 Drawing Sheets

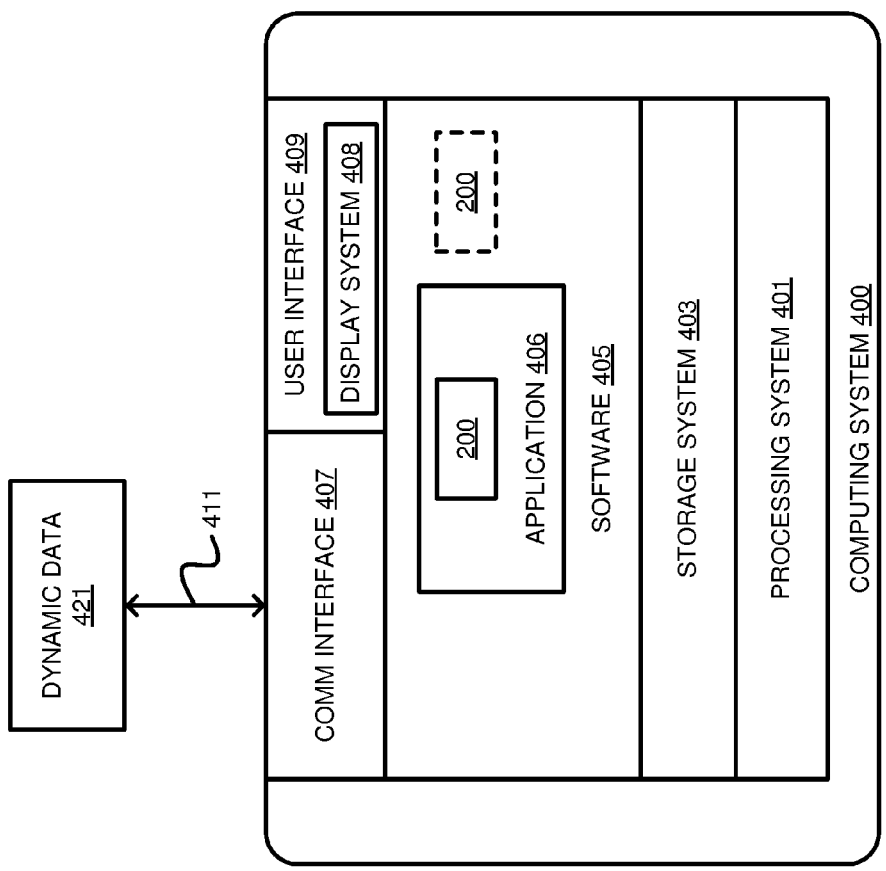

CUSTOM SECURITY POLICIES FOR MULTIPLE OBJECTS

RELATED APPLICATIONS

This application claims the benefit of, and priority to, U.S. Provisional Patent Application No. 62/168,256, entitled "CUSTOM SECURITY POLICIES FOR MULTIPLE OBJECTS", filed May 29, 2015, which is hereby incorporated by reference in its entirety for all purposes.

TECHNICAL FIELD

Aspects of the disclosure are related to computing hardware and software technology, and in particular to industrial automation applications.

TECHNICAL BACKGROUND

Industrial automation environments utilize machines during the industrial manufacturing process, such as drives, pumps, motors, and robots. These machines typically have various moving parts and other components that are driven by instructions received from industrial controller systems. Machine builders and solution providers typically produce the control logic needed to run on these controllers to control the machines. The machine builders and solution providers often attempt to restrict access to and usage of the controller logic they produce, both internally and by end users.

To configure security settings for a controller and other objects, a security administrator typically edits configuration settings for each individual object to define what actions various users are allowed to take with respect to the object. The administrator would typically manually configure each action associated with the object and select which types of users are allowed to perform which actions. The administrator would then repeat this process for every object in an industrial automation environment.

Overview

Provided herein are systems, methods, and software to facilitate controlling access to objects associated with an industrial automation environment. In at least one implementation, a policy set associated with an object type is created, wherein the policy set defines one or more actions that are allowed for at least one user group to perform with respect to the object type. An object of the object type is identified for security configuration, and a selection of the policy set associated with the object type to apply to the object is received. In response to the selection of the policy set, security is configured for the object by applying the policy set associated with the object type to the object.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 is a block diagram that illustrates a computing system in an exemplary implementation.

DETAILED DESCRIPTION

Figure 1:
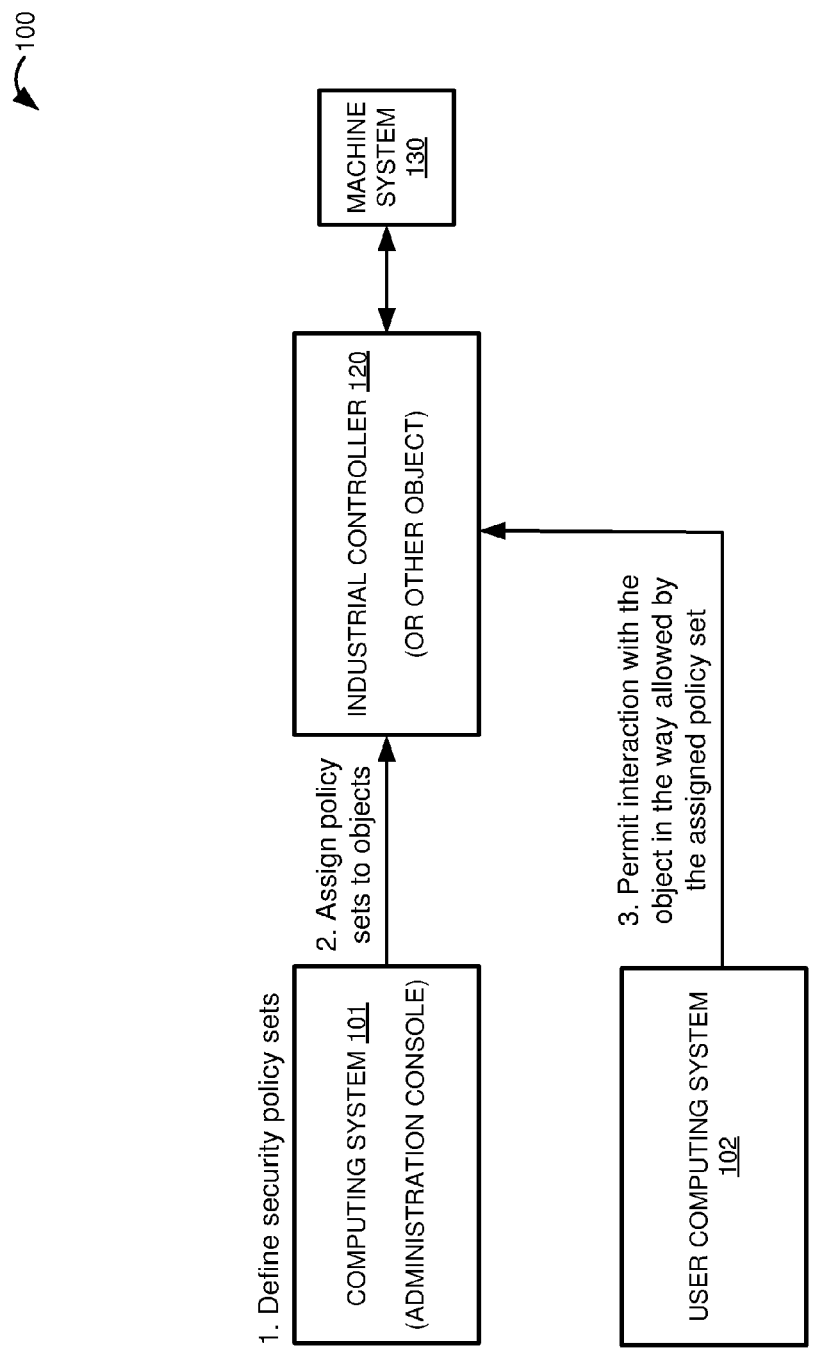
FIG. 1 is a block diagram that illustrates an industrial automation environment and an operational scenario that describes defining policy sets in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for techniques to facilitate security policy creation and enforcement for objects in an industrial automation environment. Typically, integrated architecture control systems are utilized by Original Equipment Manufacturer (OEM) machine builders, solution providers, or system integrators to produce machine logic, configuration data, routines, and add-on instructions (AOIs) used to program logic controllers that control the operation of machines, and such control logic is often protected from being viewed, edited, deleted, executed, and other actions by unauthorized parties. The techniques disclosed herein provide for a role-based access control system for controlling security of multiple objects in an industrial automation environment.

Traditionally, individual security policies are established separately for every object in an industrial automation system that define which users are allowed to perform which actions for every object individually, which makes management of these policies difficult. Further, manually going through each available action to set authorized users for every object is tedious and time consuming. To overcome these inefficiencies, security policy sets for various user types can be defined for objects in an industrial automation environment. For example, policies may be created in such a way that a set of security policies can be applied to any number of objects within the system. Each security policy set can define what actions are allowed for different users or types of users, creating a template that may be applied to several objects. Some examples of objects to which policy sets could be applied include controllers, control program logic, controller project files, add-on instructions (AOIs), and other elements in industrial systems. Sets of security policies could be created for other types of objects as well, such as human-machine interface (HMI) screens and components, machine logic, configuration data, routines and other parts of a controller project file, and any other objects associated with an industrial automation environment. Beneficially, when assigning permissions to objects in an industrial automation environment, an operator only needs to select from the various pre-defined sets of security policies to apply policies to the object, rather than going through all of the settings individually.

Figure 2:
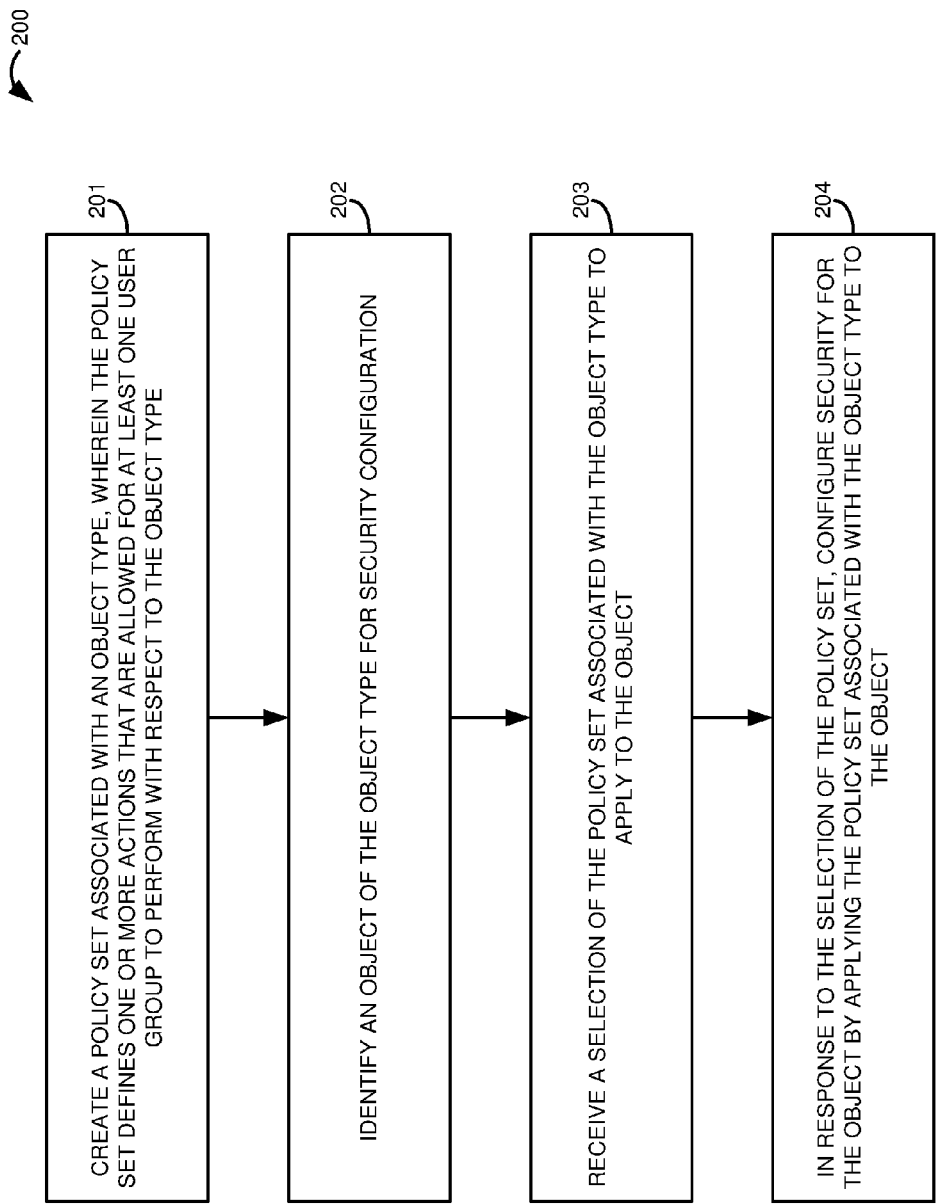
FIG. 2 is a flow diagram that illustrates an operation of a computing system in an exemplary implementation.
Figure 3:
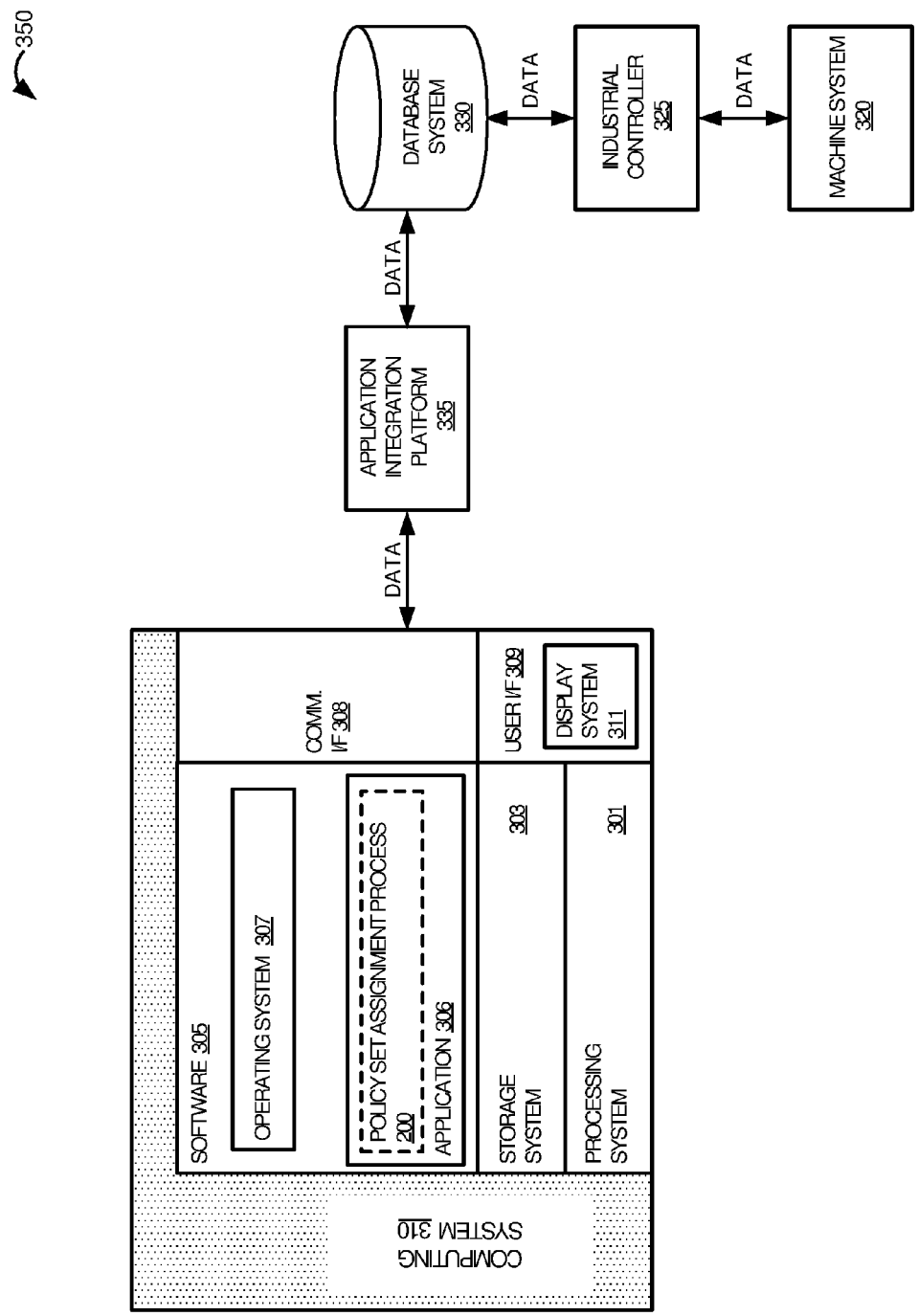
FIG. 3 is a block diagram that illustrates an operational scenario involving a computing system in an industrial automation environment in an exemplary implementation.

Referring now to the drawings, FIG. 1 illustrates an exemplary industrial automation environment that describes a technique of assigning a security policy set to an object. FIG. 2 illustrates an operation of a computing system in an exemplary implementation. FIG. 3 illustrates an exemplary industrial automation environment that includes a computing system that may be used to execute a policy set assignment process, and FIG. 4 illustrates an exemplary computing system that may be used to perform any of the processes and operational scenarios described herein.

Turning now to FIG. 1, a block diagram that illustrates industrial automation environment 100 in an exemplary implementation is shown. Industrial automation environment 100 includes computing systems 101 and 102, industrial controller 120, and machine system 130. Industrial controller 120 and machine system 130 are in communication over a communication link. In some examples, user computing system 102 could be running a control program editor, such as an RSLogix™ system or a Studio 5000® Logix Designer provided by Rockwell Automation, Inc. Note that there would typically be many more machine systems in most industrial automation environments, but the number of machine systems shown in FIG. 1 has been restricted for clarity.

Industrial automation environment 100 comprises an automobile manufacturing factory, food processing plant, oil drilling operation, microprocessor fabrication facility, or some other type of industrial enterprise. Machine system 130 could comprise a sensor, drive, pump, filter, drill, motor, robot, fabrication machinery, mill, printer, or any other industrial automation equipment, including their associated control systems. A control system comprises, for example, industrial controller 120, which could include automation controllers, programmable logic controllers (PLCs), or any other controllers used in automation control. In some examples, industrial controller 120 could comprise a ControlLogix® control system provided by Rockwell Automation, Inc. Additionally, machine system 130 could comprise other industrial equipment, such as a brew kettle in a brewery, a reserve of coal or other resources, or any other element that may reside in an industrial automation environment 100.

An exemplary operation of industrial automation environment 100 is illustrated in FIG. 1, the order of which is designated by the numerals one through three, but note that the steps could be performed in any order for any operation described herein. Initially, an administrator, a delegate of the administrator, or some other qualified individual defines security policy sets. Policies can be created in a security authority in such a way that a set of security policies can be applied to any number of objects within the system. The policy sets effectively function as templates having pre-defined actions that are allowed and denied for various user types.

Once the policy sets are defined, computing system 101 assigns the policy sets to objects. In some examples, computing system 101 could comprise a FactoryTalk® Administration Console provided by Rockwell Automation, Inc. In FIG. 1, a policy set is assigned to industrial controller 120. When a user operates user computing system 102 to interact with controller 120, the set of assigned policies dictates what actions the user may take with respect to industrial controller 120. An exemplary operation to facilitate controlling access to objects associated with an industrial automation environment will now be discussed with respect to FIG. 2.

FIG. 2 is a flow diagram that illustrates an operation 200 in an exemplary implementation. The operation 200 shown in FIG. 2 may also be referred to as policy set assignment process 200 herein. The steps of the operation are indicated below parenthetically. The following discussion of operation 200 will proceed with reference to computing systems 101 and 102, industrial controller 120, and machine system 130 of FIG. 1 in order to illustrate its operations, but note that the details provided in FIG. 1 are merely exemplary and not intended to limit the scope of process 200 to the specific implementation shown in FIG. 1.

Operation 200 may be employed to operate a computing system to facilitate controlling access to objects associated with an industrial automation environment. In some implementations, operation 200 may be performed by computing system 101, although operation 200 could be executed by any system or device having a machine authority associated with machine system 130. As shown in the operational flow of process 200, a policy set associated with an object type is created, wherein the policy set defines one or more actions that are allowed for at least one user group to perform with respect to the object type (201). The policy set is typically created by a security administrator or any other trusted individual within an organization that produces control programs, controller program code, machine system 130, human-machine interface (HMI) content, or any other object used in industrial automation. For example, the security administrator could be associated with an Original Equipment Manufacturer (OEM), solution provider, machine builder, system integrator, or some other entity that owns and/or generates control system content or other objects used in an industrial automation environment. In some examples, the administrator could comprise security personnel, a control engineer, a delegate of the manufacturer, or any other individual with sufficient security clearance to create and define policy sets for various object types.

Typically, the administrator manually creates several different policy sets, one for each different object type, although more general policy sets may also be created that could apply to several different types of objects in some examples. The object types could comprise any type of object that may be used in or associated with an industrial automation environment. For example, the object type could comprise a controller object type, a controller project file object type, including routines and other parts of a controller project file, an HMI object type, including HMI screens and components, and any other type of object used in industrial automation. There are typically multiple objects of the same object type in most industrial automation environments. In some examples, objects used in industrial automation could include any data associated with the operation of a configurable industrial automation device, such as industrial controller 120 and/or machine system 130, HMI systems, drives, or any other industrial automation device that may be configured by a user. In some examples, the objects could comprise controller program code, logic source code, controller project files, routines, add-on instructions, device settings, machine features, configuration data, HMI screens and other HMI content and components, production data, formulation data, drive configuration data, cam tables, product formulations and recipes, data sets, values, and any other content associated with the operation of an industrial automation device.

A policy set associated with an object type defines one or more actions that are allowed for at least one user group to perform with respect to the object type. Policy sets could define permissions for individual users and groups of users, such as administrators, engineers, operators, technicians, authenticated users, and any other user groups. In some examples, policy sets could include a controller policy set, a routine policy set, an HMI policy set, and policy sets for any other object types. The actions that are defined in a policy set typically relate to commands associated with the object type of which the policy set is associated that users are either permitted to perform or restricted from executing. For example, one or more actions defined in a policy set that may be allowed for a user group to perform on an object type could comprise modifying properties associated with the object type, modifying routine code, adding or deleting tags associated with the object type, viewing, creating, deleting, editing, executing, or modifying program code, instructions, or any other content, clearing controller faults, importing, exporting, uploading, or downloading control system program code or other content, or any other actions that may be performed on an object of an industrial automation environment. A policy set may define different permissions for various actions for one or more different user groups, some of which may be overlapping.

An object of the object type is identified for security configuration (202). There would typically be multiple different objects of the same object type used in an industrial automation environment. For example, there may be several different industrial controllers similar to industrial controller 120 installed in industrial automation environment 100, and an administrator could select one of these controllers for security configuration. The object of the object type could be identified for security configuration in many ways. For example, the object could be identified by the administrator or some other user creating a controller project file, generating an HMI screen, or creating any other content. In at least one implementation, multiple objects of the object type could be selected or otherwise identified for security configuration simultaneously.

A selection of the policy set associated with the object type to apply to the object is also received (203). Typically, there may be many different policy sets defined for various different object types, and an administrator would select the appropriate policy set associated with the object type of the identified object. In response to the selection of the policy set, security is configured for the object by applying the policy set associated with the object type to the object (204). For example, to configure security for the identified, object, computing system 101 would apply the selected policy set to the object. Once applied, all of the various action permissions that are defined for each type of user group in the policy set are automatically configured for that object, without requiring an administrator to set each of these permissions individually for each user group. Access to this object would then be controlled based on the policies defined in the applied policy set. For example, if an administrator identifies a controller object by creating a new controller project file, and selects a controller policy set to apply to the controller object, then configuring security for the object is facilitated by computing system 101 applying the controller policy set to the new controller project file.

Advantageously, the above techniques enable a security administrator to define generic policy sets for several different types of objects, and then quickly apply the appropriate policy set to individual objects in an industrial automation environment, and thereby greatly reducing the time required to configure security for all of the objects in the environment. By applying security policies to objects in this manner, the techniques described herein provide the technical advantage of electronically safeguarding proprietary data from unauthorized access, execution, and any other use. Further, by eliminating unauthorized requests to access and use the control program associated with industrial controller 120 and/or machine system 130, the load on the processors, drives, mechanical components, and other elements in the industrial automation environment may be reduced, resulting in significant energy savings by avoiding unnecessary unauthorized operations. Beneficially, creators of control programs and manufacturers of industrial controller 120 and/or machine system 130 can better protect and manage access to their proprietary data and equipment in a more time-efficient and effective manner.

Illustrative examples of possible implementations of employing policy sets in a Role-Based Access Control (RBAC) system will now be discussed. The following examples could be executed by computing system 101 and other elements of industrial automation environment 100, and could also be combined with operation 200 of FIG. 2 in some implementations.

In one example, a set of security policies called "ControllerPolicies" could be created, and in this set the security administrator could define which users or user groups are permitted to change controller properties, add or delete controller tags, modify routine code, create, delete, or modify add-on instructions, and any other actions. A control engineer, when creating a controller project file, could then associate the controller project file with the "ControllerPolicies" set of security policies. Access to this controller project file would then be controlled based on the policies defined within the "ControllerPolicies" set.

In an exemplary workflow, a security administrator could create a custom set of security policies, such as "ControllerPolicies" as described above. The security administrator configures "ControllerPolicies", defining what users and groups of users are permitted or prevented from performing certain actions. A control engineer then creates a controller project file called "ABC" and associates it with "ControllerPolicies". A technician then accesses the "ABC" project file, and the technician's access to "ABC" is controlled based on "ControllerPolicies". Upon accessing "ABC", security functionality causes the security authority, including the definition of "ControllerPolicies", to be cached on the technician's laptop. The technician disconnects from the network and travels to a remote customer site.

The control engineer creates a new controller project file called "DEF" and associates it with "ControllerPolicies". The control engineer then sends the new project file "DEF" to the technician in an email attachment or by any other file transfer method. Without needing to reconnect with the security authority, the technician can open and interact with the "DEF" project file, and access is controlled based on "ControllerPolicies". Advantageously, by using policy sets, the time required to configure security for all of the objects in an industrial automation environment is vastly improved. Many other use cases and workflows for defining and implementing custom sets of security policies are also supported by the techniques disclosed herein and are in the scope of this disclosure.

Turning now to FIG. 3, a block diagram that illustrates an industrial automation environment 350 in an exemplary implementation is shown. Industrial automation environment 350 provides an example of an industrial automation environment that may be utilized to implement the temporary access processes disclosed herein, but other environments could also be used. Industrial automation environment 350 includes computing system 310, machine system 320, industrial controller 325, database system 330, and application integration platform 335. Machine system 320 and controller 325 are in communication over a communication link, controller 325 and database system 330 communicate over a communication link, database system 330 and application integration platform 335 communicate over a communication link, and application integration platform 335 and computing system 310 are in communication over a communication link. Note that there would typically be many more machine systems in most industrial automation environments, but the number of machine systems shown in FIG. 3 has been restricted for clarity.

Industrial automation environment 350 comprises an automobile manufacturing factory, food processing plant, oil drilling operation, microprocessor fabrication facility, or some other type of industrial enterprise. Machine system 320 could comprise a sensor, drive, pump, filter, drill, motor, robot, fabrication machinery, mill, printer, or any other industrial automation equipment, including their associated control systems. A control system comprises, for example, industrial controller 325, which could include automation controllers, programmable logic controllers (PLCs), programmable automation controllers (PACs), or any other controllers used in automation control. Additionally, machine system 320 could comprise other industrial equipment, such as a brew kettle in a brewery, a reserve of coal or other resources, or any other element that may reside in an industrial automation environment 350.

Machine system 320 continually produces operational data over time. The operational data indicates the current status of machine system 320, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 320 and/or controller 325 is capable of transferring the operational data over a communication link to database system 330, application integration platform 335, and computing system 210, typically via a communication network. Database system 330 could comprise a disk, tape, integrated circuit, server, or some other memory device. Database system 330 may reside in a single device or may be distributed among multiple memory devices.

Application integration platform 335 comprises a processing system and a communication transceiver. Application integration platform 335 may also include other components such as a router, server, data storage system, and power supply. Application integration platform 335 may reside in a single device or may be distributed across multiple devices. Application integration platform 335 may be a discrete system or may be integrated within other systems—including other systems within industrial automation environment 350. In some examples, application integration platform 335 could comprise a FactoryTalk® VantagePoint server system provided by Rockwell Automation, Inc.

The communication links over which data is exchanged between machine system 320, industrial controller 325, database system 330, application integration platform 335, and communication interface 308 of computing system 310 could use metal, air, space, optical fiber such as glass or plastic, or some other material as the transport medium— including combinations thereof. The communication links could comprise multiple network elements such as routers, gateways, telecommunication switches, servers, processing systems, or other communication equipment and systems for providing communication and data services. These communication links could use various communication protocols, such as time-division multiplexing (TDM), internet protocol (IP), Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 310 may be representative of any computing apparatus, system, or systems on which the temporary access processes disclosed herein or variations thereof may be suitably implemented. Computing system 310 provides an example of a computing system that could be used as a either a server or a client device in some implementations, although such devices could have alternative configurations. Examples of computing system 310 include mobile computing devices, such as cell phones, tablet computers, laptop computers, notebook computers, and gaming devices, as well as any other type of mobile computing devices and any combination or variation thereof. Examples of computing system 310 also include desktop computers, server computers, and virtual machines, as well as any other type of computing system, variation, or combination thereof. In some implementations, computing system 310 could comprise a mobile device capable of operating in a server-like fashion which, among other uses, could be utilized in a wireless mesh network.

Computing system 310 includes processing system 301, storage system 303, software 305, communication interface 308, and user interface 309. Processing system 301 is operatively coupled with storage system 303, communication interface 308, and user interface 309. Processing system 301 loads and executes software 305 from storage system 303. Software 305 includes application 306 and operating system 307. Application 306 may include policy set assignment process 200 in some examples. When executed by computing system 310 in general, and processing system 301 in particular, software 305 directs computing system 310 to operate as described herein for policy set assignment process 200 or variations thereof. In this example, user interface 309 includes display system 311, which itself may be part of a touch screen that also accepts user inputs via touches on its surface. Computing system 310 may optionally include additional devices, features, or functionality not discussed here for purposes of brevity.

Turning now to FIG. 4, a block diagram is shown that illustrates computing system 400 in an exemplary implementation. Computing system 400 provides an example of computing systems 101, 102, 310, or any computing system that may be used to execute policy set assignment process 200 or variations thereof, although such systems could use alternative configurations. Computing system 400 includes processing system 401, storage system 403, software 405, communication interface 407, and user interface 409. User interface 409 comprises display system 408. Software 405 includes application 406 which itself includes policy set assignment process 200. Policy set assignment process 200 may optionally be implemented separately from application 406.

Computing system 400 may be representative of any computing apparatus, system, or systems on which application 406 and policy set assignment process 200 or variations thereof may be suitably implemented. Examples of computing system 400 include mobile computing devices, such as cell phones, tablet computers, laptop computers, notebook computers, and gaming devices, as well as any other type of mobile computing devices and any combination or variation thereof. Note that the features and functionality of computing system 400 may apply as well to desktop computers, server computers, and virtual machines, as well as any other type of computing system, variation, or combination thereof.

Computing system 400 includes processing system 401, storage system 403, software 405, communication interface 407, and user interface 409. Processing system 401 is operatively coupled with storage system 403, communication interface 407, and user interface 409. Processing system 401 loads and executes software 405 from storage system 403. When executed by computing system 400 in general, and processing system 401 in particular, software 405 directs computing system 400 to operate as described herein for policy set assignment process 200 or variations thereof. Computing system 400 may optionally include additional devices, features, or functionality not discussed herein for purposes of brevity.

Referring still to FIG. 4, processing system 401 may comprise a microprocessor and other circuitry that retrieves and executes software 405 from storage system 403. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 403 may comprise any computer readable media or storage media readable by processing system 401 and capable of storing software 405. Storage system 403 may include volatile and nonvolatile, removable and non-removable media implemented in any method or technology for storage of information, such as computer readable instructions, data structures, program modules, or other data. Storage system 403 may be implemented as a single storage device but may also be implemented across multiple storage devices or sub-systems co-located or distributed relative to each other. Storage system 403 may comprise additional elements, such as a controller, capable of communicating with processing system 401. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 409, processing system 401 loads and executes portions of software 405, such as policy set assignment process 200, to render a graphical user interface for application 406 for display by display system 408 of user interface 409. Software 405 may be implemented in program instructions and among other functions may, when executed by computing system 400 in general or processing system 401 in particular, direct computing system 400 or processing system 401 to create a policy set associated with an object type, wherein the policy set defines one or more actions that are allowed for at least one user group to perform with respect to the object type. Software 405 may further direct computing system 400 or processing system 401 to identify an object of the object type for security configuration. Software 405 may also direct computing system 400 or processing system 401 to receive a selection of the policy set associated with the object type to apply to the object. In addition, software 405 may direct computing system 400 or processing system 401 to, in response to the selection of the policy set, configure security for the object by applying the policy set associated with the object type to the object.

Software 405 may include additional processes, programs, or components, such as operating system software or other application software. Examples of operating systems include Windows®, iOS®, and Android®, as well as any other suitable operating system. Software 405 may also comprise firmware or some other form of machine-readable processing instructions executable by processing system 401.

In general, software 405 may, when loaded into processing system 401 and executed, transform computing system 400 overall from a general-purpose computing system into a special-purpose computing system customized to facilitate controlling access to objects associated with an industrial automation environment as described herein for each implementation. For example, encoding software 405 on storage system 403 may transform the physical structure of storage system 403. The specific transformation of the physical structure may depend on various factors in different implementations of this description. Examples of such factors may include, but are not limited to the technology used to implement the storage media of storage system 403 and whether the computer-storage media are characterized as primary or secondary storage.

In some examples, if the computer-storage media are implemented as semiconductor-based memory, software 405 may transform the physical state of the semiconductor memory when the program is encoded therein. For example, software 405 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 400 is generally intended to represent a computing system with which software 405 is deployed and executed in order to implement application 406 and/or policy set assignment process 200 (and variations thereof). However, computing system 400 may also represent any computing system on which software 405 may be staged and from where software 405 may be distributed, transported, downloaded, or otherwise provided to yet another computing system for deployment and execution, or yet additional distribution. For example, computing system 400 could be configured to deploy software 405 over the internet to one or more client computing systems for execution thereon, such as in a cloud-based deployment scenario.

Communication interface 407 may include communication connections and devices that allow for communication between computing system 400 and other computing systems (not shown) or services, over a communication network 411 or collection of networks. In some implementations, communication interface 407 receives dynamic data 421 over communication network 411. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting non-touch gestures and other motions by a user, and other comparable input devices and associated processing elements capable of receiving user input from a user. Output devices such as display system 408, speakers, haptic devices, and other types of output devices may also be included in user interface 409. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate controlling access to objects associated with an industrial automation environment, the method comprising:
    creating a policy set associated with an object type, wherein the policy set defines one or more actions that are allowed for at least one user group to perform with respect to the object type and the one or more actions comprise modifying properties associated with the object type;
    identifying an object of the object type for security configuration;
    receiving a selection of the policy set associated with the object type to apply to the object; and
    in response to the selection of the policy set, configuring security for the object by applying the policy set associated with the object type to the object.

2. The method of claim 1 wherein the object type comprises a controller object type and the policy set associated with the object type comprises a controller policy set.

3. The method of claim 2 wherein identifying the object of the object type for security configuration comprises creating a controller project file, and wherein configuring security for the object by applying the policy set comprises applying the controller policy set to the controller project file.

4. The method of claim 1 wherein the one or more actions that are allowed for the at least one user group to perform on the object type comprise adding tags associated with the object type.

5. The method of claim 1 wherein the one or more actions that are allowed for the at least one user group to perform on the object type comprise modifying routine code.

6. The method of claim 1 wherein the one or more actions that are allowed for the at least one user group to perform on the object type comprise deleting tags associated with the object type.

7. The method of claim 1 wherein the object type comprises a human-machine interface (HMI) object type.

8. One or more computer-readable storage media having program instructions stored thereon to facilitate controlling access to objects associated with an industrial automation environment, wherein the program instructions, when executed by a computing system, direct the computing system to at least:
    create a policy set associated with an object type, wherein the policy set defines one or more actions that are allowed for at least one user group to perform with respect to the object type and the one or more actions comprise modifying properties associated with the object type;
    identify an object of the object type for security configuration;
    receive a selection of the policy set associated with the object type to apply to the object; and
    in response to the selection of the policy set, configure security for the object by applying the policy set associated with the object type to the object.

9. The one or more computer-readable storage media of claim 8 wherein the object type comprises a controller object type and the policy set associated with the object type comprises a controller policy set.

10. The one or more computer-readable storage media of claim 9 wherein the program instructions direct the computing system to identify the object of the object type for security configuration by directing the computing system to create a controller project file, and wherein the program instructions direct the computing system to configure security for the object by directing the computing system to apply the controller policy set to the controller project file.

11. The one or more computer-readable storage media of claim 8 wherein the one or more actions that are allowed for the at least one user group to perform on the object type comprise adding tags associated with the object type.

12. The one or more computer-readable storage media of claim 8 wherein the one or more actions that are allowed for the at least one user group to perform on the object type comprise modifying routine code.

13. The one or more computer-readable storage media of claim 8 wherein the one or more actions that are allowed for the at least one user group to perform on the object type comprise deleting tags associated with the object type.

14. The one or more computer-readable storage media of claim 8 wherein the object type comprises a human-machine interface (HMI) object type.

15. An apparatus to facilitate controlling access to objects associated with an industrial automation environment, the apparatus comprising:
  one or more computer-readable storage media; and
  program instructions stored on the one or more computer-readable storage media that, when executed by a processing system, direct the processing system to at least:
    create a policy set associated with an object type, wherein the policy set defines one or more actions that are allowed for at least one user group to perform with respect to the object type and the one or more actions comprise modifying properties associated with the object type;
    identify an object of the object type for security configuration;
    receive a selection of the policy set associated with the object type to apply to the object; and
    in response to the selection of the policy set, configure security for the object by applying the policy set associated with the object type to the object.

16. The apparatus of claim 15 wherein the object type comprises a controller object type and the policy set associated with the object type comprises a controller policy set.

17. The apparatus of claim 16 wherein the program instructions direct the processing system to identify the object of the object type for security configuration by directing the processing system to create a controller project file, and wherein the program instructions direct the processing system to configure security for the object by directing the processing system to apply the controller policy set to the controller project file.

18. The apparatus of claim 15 wherein the one or more actions that are allowed for the at least one user group to perform on the object type comprise adding tags associated with the object type.

19. The apparatus of claim 15 wherein the one or more actions that are allowed for the at least one user group to perform on the object type comprise modifying routine code.

20. The apparatus of claim 15 wherein the one or more actions that are allowed for the at least one user group to perform on the object type comprise deleting tags associated with the object type.

* * * * *